United States Patent
Altice, Jr. et al.

(10) Patent No.: US 7,324,690 B2
(45) Date of Patent: Jan. 29, 2008

(54) METAL MASK FOR LIGHT INTENSITY DETERMINATION AND ADC CALIBRATION

(75) Inventors: Peter P. Altice, Jr., Meridian, ID (US); Jeffrey A. McKee, Meridian, ID (US); Grzegorz M. Waligorski, Manhattan Beach, CA (US)

(73) Assignee: Micron Technology, Inc., Boise, ID (US)

( * ) Notice: Subject to any disclaimer, the term of this patent is extended or adjusted under 35 U.S.C. 154(b) by 740 days.

(21) Appl. No.: 10/653,971

(22) Filed: Sep. 4, 2003

(65) Prior Publication Data

US 2005/0052561 A1    Mar. 10, 2005

(51) Int. Cl.
*G06K 9/00* (2006.01)
(52) U.S. Cl. ..................................... 382/181
(58) Field of Classification Search ................ 382/181, 382/213, 218, 312, 151, 307; 348/362
See application file for complete search history.

(56) References Cited

U.S. PATENT DOCUMENTS

| | | | | |
|---|---|---|---|---|
| 4,408,231 A | * | 10/1983 | Bushaw et al. ............. 358/406 |
| 5,489,994 A | * | 2/1996 | Torok et al. ................. 358/483 |
| 5,833,507 A | * | 11/1998 | Woodgate et al. ............ 445/24 |
| 6,057,586 A | | 5/2000 | Bawolek et al. |
| 6,124,920 A | * | 9/2000 | Moseley et al. ............ 349/201 |
| 6,235,549 B1 | | 5/2001 | Bawolek et al. |
| 6,272,207 B1 | * | 8/2001 | Tang .......................... 378/149 |
| 6,278,169 B1 | | 8/2001 | Sayuk et al. |
| 6,529,239 B1 | * | 3/2003 | Dyck et al. ................. 348/279 |
| 6,667,769 B2 | * | 12/2003 | Harton et al. ............... 348/308 |
| 6,872,895 B2 | * | 3/2005 | Cochran et al. ............... 177/1 |
| 6,958,768 B1 | * | 10/2005 | Rao et al. ..................... 348/86 |
| 2005/0030413 A1 | * | 2/2005 | Gough ....................... 348/362 |

* cited by examiner

*Primary Examiner*—Daniel Mariam
(74) *Attorney, Agent, or Firm*—Dickstein Shapiro LLP

(57) ABSTRACT

An apparatus and method for controlling gain characteristics in a CMOS imager and for calibrating light intensity and analog to digital conversion in a pixel array. A mask with varying sized apertures is provided over pixels of an array outside the active area for use in intensity adjustments and calibration.

30 Claims, 3 Drawing Sheets

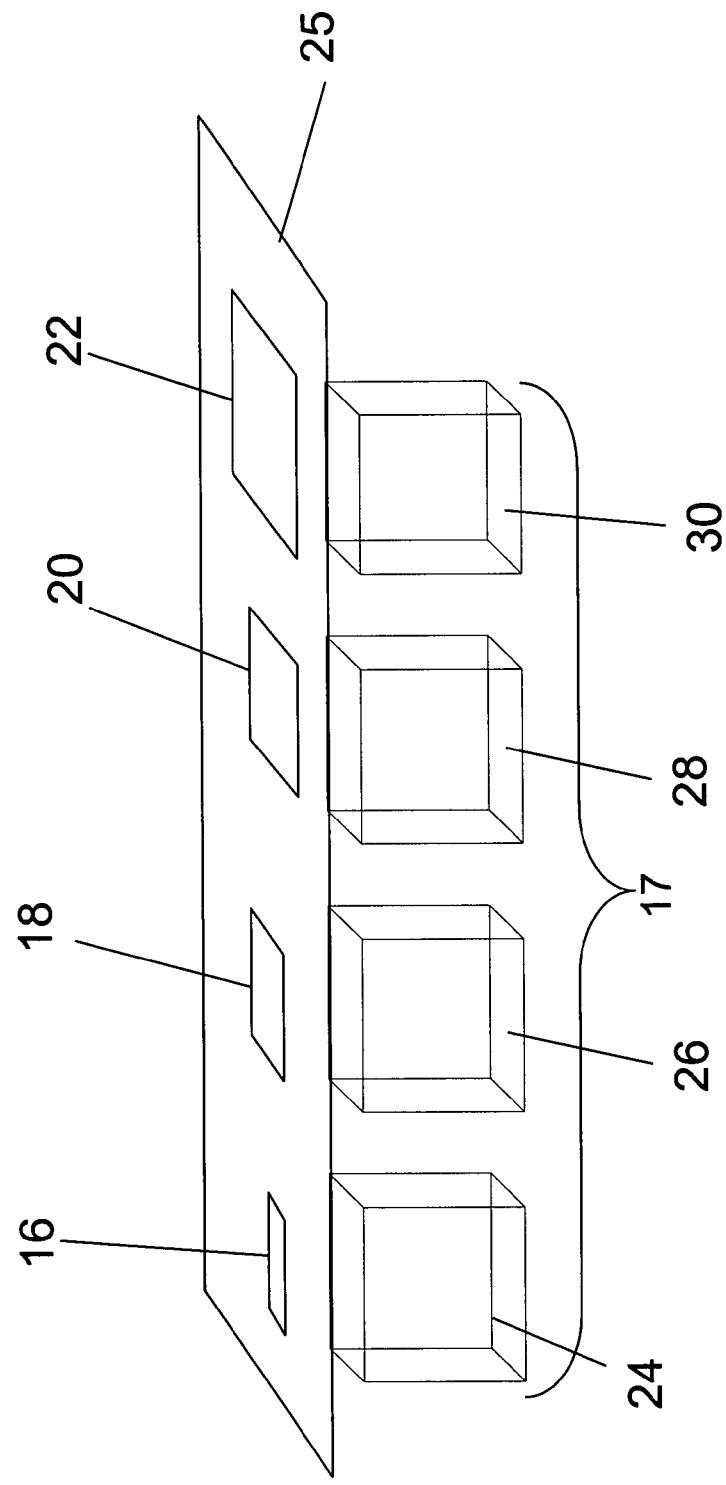

METAL MASK FOR LIGHT INTENSITY DETERMINATION AND ADC CALIBRATION

FIELD OF THE INVENTION

The invention relates generally to a mask apparatus and methods of using a mask apparatus to calibrate and test light intensity and analog to digital conversion of a pixel imager.

BACKGROUND OF THE INVENTION

A CMOS imager circuit includes a focal plane array of pixel cells, each one of the cells including a photoconversion device, for example a photogate, a photoconductor, or a photodiode, for generating and accumulating photo-generated charge in a portion of the substrate. A readout circuit is provided within each pixel cell and includes at least an output transistor, which receives photogenerated charges from the photosensor through a doped diffusion region and produces an output signal which is periodically read-out through a pixel access transistor. The imager may optionally include a transistor for transferring charge from the photoconversion device to the diffusion region or the diffusion region may be directly connected to or be part of the photoconversion device. A transistor is also typically provided for resetting the diffusion region to a predetermined charge level before it receives the photoconverted charges.

An imager circuit having an array of pixel cells often has an associated color filter, such as a color filter arranged in a Bayer pattern for discerning differing wavelengths of light in different pixel cells.

Exemplary CMOS imaging circuits, processing steps thereof, and detailed descriptions of the functions of various CMOS elements of an imaging circuit are described, for example, in U.S. Pat. No. 6,140,630 to Rhodes, U.S. Pat. No. 6,376,868 to Rhodes, U.S. Pat. No. 6,310,366 to Rhodes et al., U.S. Pat. No. 6,326,652 to Rhodes, U.S. Pat. No. 6,204,524 to Rhodes, and U.S. Pat. No. 6,333,205 to Rhodes. The disclosures of each of the forgoing patents are herein incorporated by reference in their entirety. 6,333,205 to Rhodes. The disclosures of each of the forgoing patents are herein incorporated by reference in their entirety.

FIG. 1 illustrates a block diagram for a CMOS imager device 308 having a pixel array 200, which contains a plurality of color pixels arranged in a predetermined number of columns and rows. The pixels of each row in array 200 are all turned on at the same time by a row select line, and the pixels of each column are selectively output by a column select line. The row lines are selectively activated by the row driver 210 in response to row address decoder 220 and the column select lines are selectively activated by the column driver 260 in response to column address decoder 270. Thus, a row and column address is provided for each pixel. The imager is operated by the timing and control circuit 250 which controls address decoders 220, 270 for selecting the appropriate row and column lines for pixel operation and readout. Row and column driver circuitry 210, 260 apply driving voltage to the drive transistors for selected row and column lines. The column lines are coupled to sample and hold circuits 261, 262, which sample and hold a reset voltage $V_{rst}$ and a signal voltage $V_{sig}$ for each pixel. A differential signal $V_{rst}-V_{sig}$ is produced for each pixel. The differential signal is amplified and digitized by analog to digital converter 275 and fed to an image processor 280, which produces an output image signal from the digitized pixel signals.

The gain characteristics of the pixel signals are an important factor for proper operation of the imager array and subsequent processing circuitry. Different colored pixels have different light response gains. In addition, the analog signal processing circuitry and analog to digital conversion must be balanced and calibrated to remove aberrations in the gain characteristics for the different colors. Conventional methods require a great deal of processing to adjust and test the pixel signal gain characteristics of the various pixel signal processing circuits. The adjustment of gain characteristics during processing is complicated and requires the occupation of valuable real estate on the chip. Testing and calibration of the gain characteristics requires the production of signal outputs under varying light or voltage conditions. Multiple measurements are required to obtain a single result.

Calibration of integration time and analog to digital conversion accuracy are examples of gain characteristics that are typically calibrated and optimized in an imager device. The integration time is the amount of time that the pixel is receiving light photons, converting the photons to a charge and accumulating the charge, before the charge is stored or read out. The integration (i.e. exposure) time can be reduced to optimize exposure to the dynamic range of the pixel and to control potential blooming issues. Blooming can occur when too many photons strike a particular pixel cell and generate charges that overflow into adjacent pixels, causing the adjacent pixels to incorrectly sense the image. However, some colors saturate more quickly than others and different arrays have differing saturation points and gain characteristics. Pixel sensor cells will vary in their saturation point based on the wavelength of the particular color being absorbed, light intensity, gain characteristics and integration time. Since typically three color sensors (red, blue, green) are needed to correctly sense an image, it is difficult to customize and synchronize the integration times of the different colors having different saturation points under variable light intensity conditions to control blooming and saturation.

The accuracy of the analog to digital conversion process is another gain characteristic which is typically calibrated during processing. FIG. 1 shows analog to digital converter (ADC) 275, which during operation converts analog signals from the sample/hold circuits 261, 262 to digital signals that are fed to the image processor 280, which outputs the image signal from the digitized pixel signals. The ADC 275 must be calibrated so that analog to digital conversion is accurate and optimal during operation of the imager. Typically, ADC calibration requires a stable external voltage source. The stable external voltage source is used to apply differing and known voltages to the converter and the resulting digital output signal is read out and compared to an expected digital output signal. Each known voltage is applied separately. Conventional technology requires multiple measurements to obtain ADC calibration information which is undesirable. There is a need for a faster and more efficient method of determining light intensity and performing ADC calibration on the pixel array.

SUMMARY

The present invention provides an apparatus and method which is useful during processing or operation for calibrating an analog to digital converter (ADC) or for setting a proper integration time in a CMOS imager. An opaque mask with varying sized apertures is provided over pixels of an array outside the active area for use in integration time adjustments and calibration of the ADC. This reduces the amount of measurements typically required by conventional CMOS imagers.

Additional advantages and features of the present invention will be apparent from the following detailed description and drawings which illustrate exemplary embodiments of the invention.

BRIEF DESCRIPTION OF THE DRAWINGS

FIG. 3 is a schematic cross-sectional view of pixel sensor cells with a mask with varying aperture sizes according to another embodiment of the invention.

DETAILED DESCRIPTION OF THE INVENTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention. Additionally, processing steps described and their progression are exemplary of preferred embodiments of the invention; however, the sequence of steps is not limited to that set forth herein and may be changed as is known in the art, with the exception of steps necessarily occurring in a certain order.

The terms "wafer" and "substrate" are to be understood as including silicon, silicon-on-insulator (SOI) or silicon-on-sapphire (SOS) technology, doped and undoped semiconductors, epitaxial layers of silicon supported by a base semiconductor foundation, and other silicon based semiconductor structures. Furthermore, when reference is made to a "wafer" or "substrate" in the following description, previous process steps may have been utilized to form regions, junctions or material layers in or on the base semiconductor structure or foundation. In addition, the semiconductor need not be silicon-based, but could be based on silicon-germanium, germanium, or gallium arsenide.

The term "pixel" refers to a photo-element unit cell containing a photoconversion device and in the case of CMOS imagers, the associated transistors for converting photo-electrons to an electrical signal. Although described in relation to a CMOS image sensor, the invention is also applicable to analogous structures of other image sensors. For example the invention may also be applicable to a Charge Coupled Device (CCD). The following detailed description is not to be taken in a limiting sense, and the scope of the present invention is defined by the appended claims.

Figure 1:
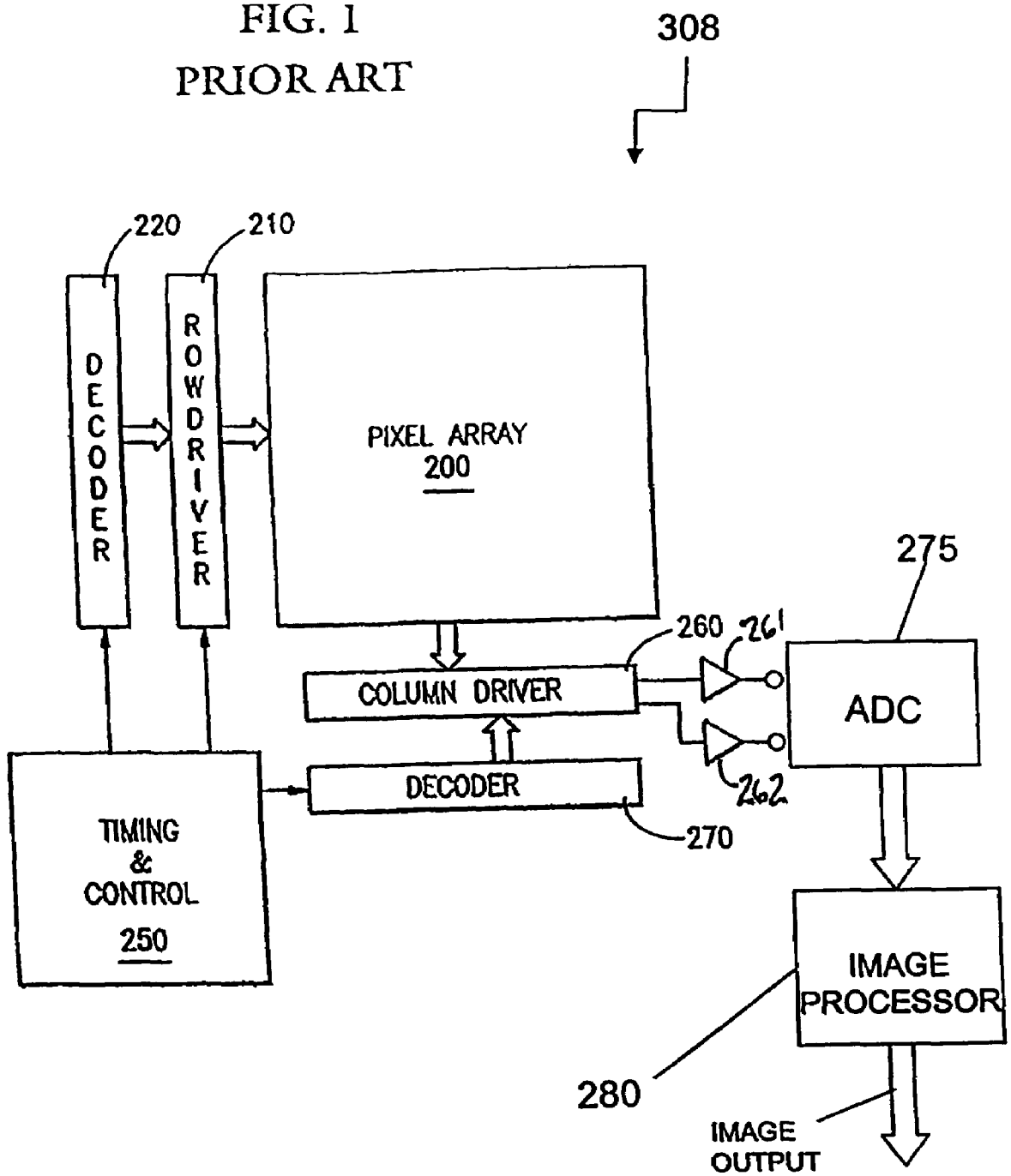
FIG. 1 is a block diagram of an imager, a device employing a CMOS pixel array.
Figure 2:
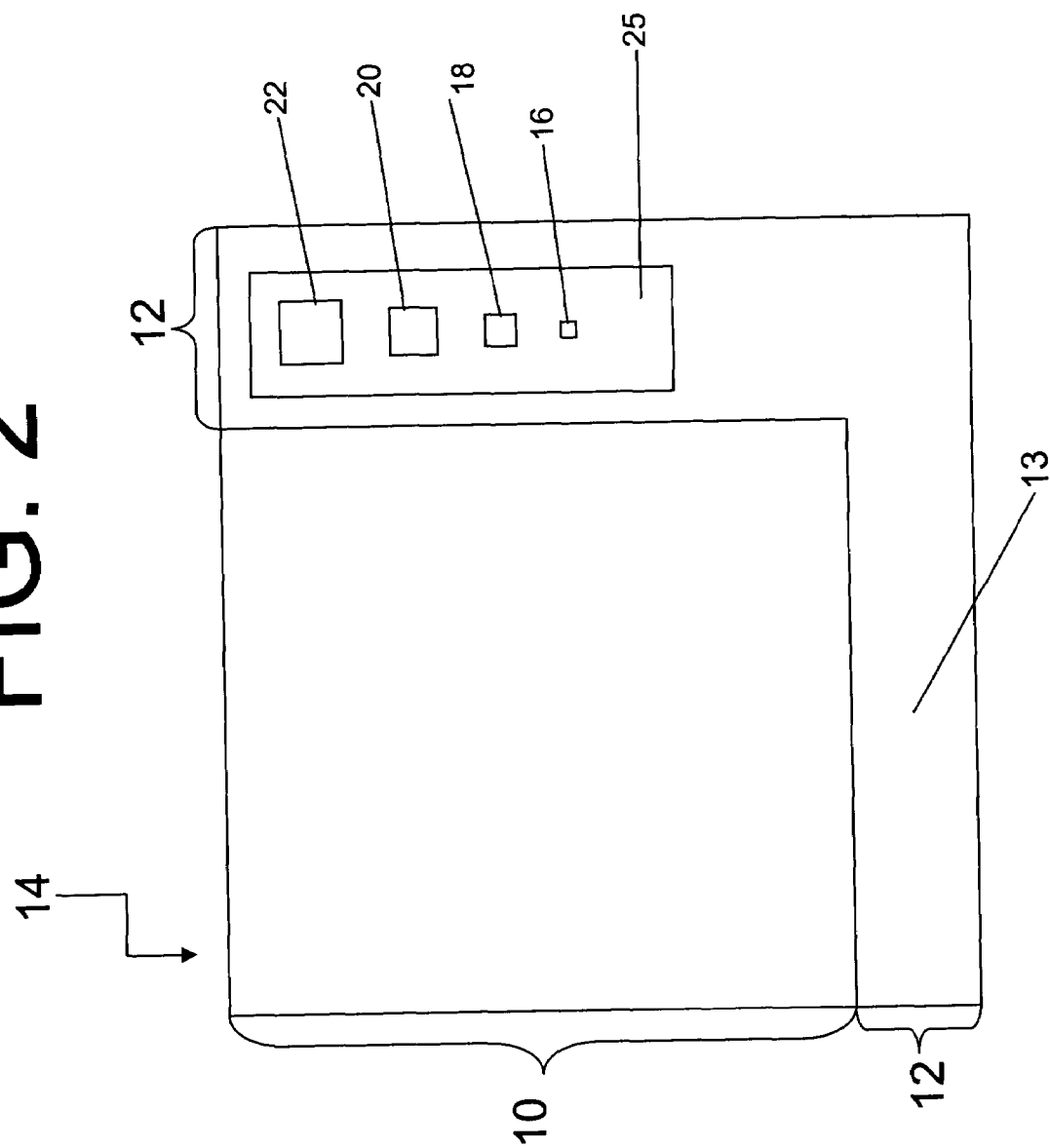
FIG. 2 is a schematic drawing of a pixel array according to an embodiment of the invention.

Now referring to the figures, where like reference numbers designate like elements, FIG. 2 shows one embodiment of the invention. A pixel array 14 has rows and columns (not shown) of pixels arranged in active image receiving area 10 and a non-active area 12, which is located outside the active area 10. The non-active area 12 can include one or more columns or rows of pixels anywhere outside active area 10 or a mix of rows and columns. In FIG. 2, a column of pixels is beneath the mask area 25. The active area 10 and non-active area 12 are defined by a mask 13 provided over array 14. In addition to separating the array 14 into active 10 and non-active 12 pixel areas, the mask 13 also contains a mask area 25 having apertures 16, 18, 20, 22 exposing pixels in the non-active area 12.

The active area 10 contains active pixels for light detection and image formation. In the examples that follow, pixels in non-active area 12 exposed through exemplary apertures 16, 18, 20, 22 are used for light intensity determination or ADC calibration and not for image formation. Specifically, when exposed to light, the pixels exposed through apertures 16, 18, 20, 22 can be utilized to calibrate, test and measure light intensity and these measurements are used to set integration times for the active area 10 pixels. In addition, these same exposed pixels can be used to calibrate the ADC during initial processing of the imager device 308. By calibrating the ADC in this manner, the present invention does not require use of an external precise voltage source, as do conventional calibration techniques.

Gain characteristics can be tested and controlled by using the non-active area pixels as described in the examples below. Typically, gain characteristics are calibrated based on signal output by applying different levels of light or voltage. The mask according to the invention allows differing exposures for non-active area 12 pixels and thus eliminates the need for testing with different levels of light because the varying sized apertures replicate varying levels of light by allowing differing amounts of light from one light source to strike the photosensitive regions. Also, since the testing is done outside the active area 10 of the array, less processing is needed to adjust gain characteristics.

An exemplary column of pixels 17 beneath the mask 25 in the non-active area 12 is shown in FIG. 3. A mask 25, as shown in of FIG. 3, with exemplary varying-sized apertures 16, 18, 20, 22 is placed over pixels 24, 26, 28, 30 in non-active area 12. FIG. 3 is an example showing only four pixels covered by the mask 25 with four apertures, however, any number of apertures can be placed over any number of pixels. That is, the invention is not to be limited to a specific number of apertures and pixels in the non-active area 12. The shape of the apertures is shown for exemplary purposes as square or rectangular in FIG. 3, however, any suitable shape could be utilized. That is, the invention is not to be limited to a specific shape for the apertures of mask 25. The mask 25, shown in FIG. 3, is made of an opaque material and for exemplary purposes is made of metal. The sizes of pixels 24, 26, 28, 30 in the non-active area 12 can be smaller or larger than the size of the pixels of the active area 10. Alternatively, the mask 25 may be covered with a color filter array and can be placed above or below the color filter array.

An exemplary method of using the mask with varying aperture sizes is described below. In this embodiment, the mask 25 according to the invention is used for determining light intensity during operation of the array or for testing purposes. An example with four pixels is shown in FIG. 3, discussed above, where aperture 16 is comparatively smaller than aperture 18 located adjacent to it, and in turn aperture 20 is comparatively smaller than aperture 22 next to it. In the illustrated embodiment, aperture 16 is smaller than aperture 18, which is smaller than aperture 20, which is smaller than aperture 22. The gradation of aperture sizes allows differing levels of light to strike the photosensitive area using only one light source, i.e., smaller aperture sizes will allow less light to strike the pixel, while larger aperture sizes allow more light to strike the pixel. Aperture sizes steadily increase in this embodiment and the incrementally increasing aperture sizes are used to test the point where the pixels will be saturated under differing light intensity conditions. The light intensity determinations are provided as feedback to a circuit or chip, wherein the circuit or chip will then be programmed to vary the integration time based on the light intensity determination.

For example, under a known light intensity, pixel 26 beneath aperture 18 will not be saturated while pixel 28 beneath aperture 20, which is located directly adjacent to aperture 18 and being slightly larger than aperture 18, will be saturated. Comparison of the non-saturated pixel against the saturated pixel based on the size of the aperture determines where to set the integration time (or pixel gain) for the entire array in the active area 10. Adjustments may be made to the integration time until it is optimal for all the pixels under different light intensity conditions. Pixels 24, 26, 28, 30 can be utilized for light intensity determination with or without a color filter. Integration times may be adjusted until the gain characteristics are optimal based on expected light intensity or individual requirements.

A second embodiment according to the invention is a method of using the mask with varying sized apertures to calibrate analog to digital conversion during processing. As shown in FIG. 3, an opaque mask 25 with varying sized apertures 16, 18, 20, 22, is placed over a non-active area 12 on the pixel array. The aperture sizes, as discussed above, are gradiated from smaller to larger, also shown in FIG. 3. A known amount of light of a predetermined intensity is shone on the non-active area 12. Each pixel 24, 26, 28, 30 stores and outputs a signal according to its exposure to light. Each pixel receives a different amount of light, based on the size of the aperture 16, 18, 20, 22 placed over that particular pixel 24, 26, 28, 30. A digital output is read and compared to an expected digital output, based on the amount of light input, for each sized aperture and the known light intensity. A voltage ramp is created which can be used to test and calibrate the ADC. Only one light illumination is needed and no stable external voltage source is required. Thus, the method of the present invention is preferred over the conventional method.

While the invention has been described and illustrated with reference to specific exemplary embodiments, it should be understood that many modifications and substitutions could be made without departing from the spirit and scope of the invention. Accordingly, the invention is not to be considered limited by the foregoing description but is only limited by the scope of the appended claims.

What is claimed as new and desired to be protected by Letters Patent of the United States is:

1. An imager apparatus comprising:
   a pixel array having an active imaging area and a non-active area, said pixel array having a plurality of first pixels in said active area and a plurality of second pixels in said non-active area; and
   a mask having a plurality of apertures respectively located over and exposing said second pixels,
   wherein a signal from at least one second pixel is used to determine light intensity.

2. The imager according to claim 1, wherein said apertures expose said second pixels to differing amounts of light.

3. The imager according to claim 2, wherein at least some of said apertures of said mask are of different sizes.

4. The imager according to claim 2, wherein said apertures of said mask are gradiated such that each successive aperture is larger than one adjacent to it.

5. The imager according to claim 2, wherein said mask is made of metal.

6. The imager according to claim 2, wherein said second pixels comprise at least one row of pixels outside said active area.

7. The imager according to claim 2, wherein said second pixels comprise at least one column of pixels outside said active area.

8. The imager according to claim 2, wherein said second pixels are a different size from said first pixels.

9. The imager according to claim 2, wherein said second pixels are covered by a color filter.

10. The imager apparatus according to claim 2, wherein only said aperture sizes vary said respective exposures of said second pixels to said light.

11. The imager according to claim 1, wherein a signal from at least one second pixel is used to calibrate an analog to digital converter.

12. The imager apparatus according to claim 1, wherein said active area detects light for image formation and said non-active area detects light for calibrating gain characteristics of said first pixels.

13. The imager apparatus according to claim 12, wherein said first pixels generate imaging signals for said image formation and said second pixels each generate a test signal indicating a respective different light exposure controlled by at least one of said apertures, said test signals being used to determine gain characteristics of said image signals.

14. A method of determining light intensity in an imager, said method comprising:
   shining a light of predetermined intensity through a mask over an array, said array comprising an active imaging area having a plurality of first pixels and a non-active area having a plurality of second pixels and said mask comprising apertures having varying aperture sizes over said second pixels;
   determining a light intensity threshold for saturation of said second pixels based on varying exposures corresponding to said varying aperture sizes; and
   determining an integration time of the first pixels based on the determined light intensity.

15. The method according to claim 14, further comprising:
   varying an integration time for said first pixels based on said light intensity determination.

16. The method according to claim 14, wherein said second pixels comprise at least one row of pixels outside said active area.

17. The method according to claim 14, wherein said second pixels comprise at least one colunm of pixels outside said active area.

18. The method according to claim 14, wherein said varying aperture sizes of the mask are gradiated such that each aperture is larger than the one adjacent to it.

19. The method according to claim 14, wherein said second pixels are a different size from said first pixels.

20. The method according to claim 14, wherein said second pixels are covered by a color filter.

21. The method according to claim 14, wherein said active area detects light for image formation and said non-active area detects light for calibration of gain characteristics.

22. The method according to claim 14, wherein only said aperture sizes vary said respective exposures of said second pixels to said light.

23. A method of calibrating analog to digital conversion of an analog to digital converter in an imager comprising:
   shining a light of predetermined intensity through a mask over an array, said array comprising an active imaging area having a plurality of first pixels and a non-active area having a plurality of second pixels and said mask comprising apertures having varying aperture sizes over said second pixels;

measuring light received at said second pixels exposed by the varying sized apertures;

converting said measured light received from analog to digital signals; and calibrating said analog to digital conversion using the digital signals.

24. The method according to claim 23, wherein said digital output from each of said second pixels is compared with an expected digital output and a voltage ramp is created from said comparison to test and calibrate analog to digital conversion.

25. The method according to claim 23, wherein said second pixels comprise at least one row of pixels outside said active area.

26. The method according to claim 23, wherein said second pixels comprise at least one column of pixels outside said active area.

27. The method according to claim 23, wherein said varying aperture sizes of the mask are gradiated such that each aperture is larger than the one adjacent to it.

28. The method according to claim 23, wherein said second pixels are a different size from said first pixels.

29. The method according to claim 23, wherein said active area detects light for image formation and said non-active area detects light for calibration of gain characteristics.

30. The method according to claim 23, wherein only said aperture sizes vary said respective exposures of said second pixels to said light.

* * * * *

UNITED STATES PATENT AND TRADEMARK OFFICE
CERTIFICATE OF CORRECTION

| | | |
|---|---|---|
| PATENT NO. | : 7,324,690 B2 | Page 1 of 1 |
| APPLICATION NO. | : 10/653971 | |
| DATED | : January 29, 2008 | |
| INVENTOR(S) | : Altice, Jr. et al. | |

It is certified that error appears in the above-identified patent and that said Letters Patent is hereby corrected as shown below:

In column 6, line 14, in Claim 11, delete "claim 1" and insert -- claim 2 --, therefor.

In column 6, line 48, in Claim 17, delete "colunm" and insert -- column --, therefor.

Signed and Sealed this

Fourth Day of November, 2008

JON W. DUDAS
*Director of the United States Patent and Trademark Office*